United States Patent
Ljung (10) Patent No.: US 11,546,939 B2
(45) Date of Patent: Jan. 3, 2023

(54) LISTEN BEFORE TALK OPERATION WITH VARIABLE THRESHOLD

(71) Applicant: Sony Mobile Communications Inc., Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 194 days.

(21) Appl. No.: 16/348,339

(22) PCT Filed: Nov. 10, 2016

(86) PCT No.: PCT/EP2016/077235
§ 371 (c)(1),
(2) Date: May 8, 2019

(87) PCT Pub. No.: WO2018/086691
PCT Pub. Date: May 17, 2018

(65) Prior Publication Data
US 2021/0127418 A1 Apr. 29, 2021

(51) Int. Cl.
*H04W 74/08* (2009.01)
*H04W 24/10* (2009.01)
*H04W 16/14* (2009.01)
*H04B 17/336* (2015.01)

(52) U.S. Cl.
CPC ...... *H04W 74/0808* (2013.01); *H04B 17/336* (2015.01); *H04W 16/14* (2013.01); *H04W 24/10* (2013.01)

(58) Field of Classification Search
CPC .......... H04W 28/04; H04W 72/04; H04W 72/042; H04W 88/08; H04W 16/14; H04W 24/10; H04W 74/0808; H04W 17/336; H04L 5/0007

USPC .......................................................... 370/329
See application file for complete search history.

(56) References Cited

U.S. PATENT DOCUMENTS

| 2014/0293905 A1 | 10/2014 | Tian | |
| 2015/0085797 A1* | 3/2015 | Ji | H04L 5/0048 370/336 |
| 2015/0163824 A1* | 6/2015 | Krzymien | H04W 28/18 370/338 |

(Continued)

FOREIGN PATENT DOCUMENTS

| CN | 104038950 A | 9/2014 |
| CN | 105075379 A | 11/2015 |

(Continued)

OTHER PUBLICATIONS

International Search Report and Written Opinion from counterpart International Patent Application No. PCT/EP2016/077235 dated Aug. 1, 2017; 13 pages.

(Continued)

*Primary Examiner* — Peter G Solinsky
*Assistant Examiner* — Sanjay K Dewan
(74) *Attorney, Agent, or Firm* — Tucker Ellis LLP (57) ABSTRACT

A signal is queued (150) for transmission on a spectrum. An energy level of interference on the spectrum is sensed and, depending on a signal type of the signal (150), a threshold is determined. Then, a threshold comparison between the sensed energy level and the determined threshold is performed, and depending on the threshold comparison, the signal is selectively transmitted on the spectrum.

14 Claims, 9 Drawing Sheets

(56) References Cited

U.S. PATENT DOCUMENTS

| | | | |
|---|---|---|---|
| 2015/0296528 A1* | 10/2015 | Coffey | H04L 1/1867 370/338 |
| 2015/0358904 A1* | 12/2015 | Kwon | H04W 24/08 370/252 |
| 2015/0365880 A1 | 12/2015 | Malladi | |
| 2015/0373652 A1 | 12/2015 | Dabeer | |
| 2016/0173361 A1* | 6/2016 | Somasundaram | H04W 24/08 370/328 |
| 2016/0174233 A1 | 6/2016 | Emmanuel et al. | |
| 2017/0048916 A1* | 2/2017 | Yoo | H04B 17/318 |
| 2017/0111931 A1* | 4/2017 | Damnjanovic | H04W 74/0825 |
| 2017/0150524 A1* | 5/2017 | Oh | H04W 74/0808 |
| 2018/0152966 A1* | 5/2018 | Goldhamer | H04W 74/002 |
| 2018/0249499 A1* | 8/2018 | Kim | H04W 16/14 |
| 2018/0288620 A1* | 10/2018 | Jayawickrama | H04W 72/0453 |
| 2019/0090245 A1* | 3/2019 | Ansari | H04W 72/082 |
| 2019/0150182 A1* | 5/2019 | Koorapaty | H04L 5/0094 370/329 |
| 2019/0150196 A1* | 5/2019 | Koorapaty | H04L 1/1832 370/329 |
| 2019/0174546 A1* | 6/2019 | Jeon | H04W 74/0816 |
| 2020/0084759 A1* | 3/2020 | Liu | H04W 16/14 |
| 2020/0146064 A1* | 5/2020 | Oh | H04L 1/1614 |
| 2021/0051718 A1* | 2/2021 | Bhattad | H04W 72/14 |

FOREIGN PATENT DOCUMENTS

| | | | | |
|---|---|---|---|---|
| EP | 3285435 A1 | * | 2/2018 | H04L 12/28 |
| JP | 2015076752 A | | 4/2015 | |
| JP | 2016005114 A | | 1/2016 | |
| WO | 2016163802 A1 | | 10/2016 | |
| WO | WO 2016/163802 A1 | * | 10/2016 | H04L 1/0069 |
| WO | WO-2016165656 A1 | * | 10/2016 | H04W 74/0816 |
| WO | 2016067738 A1 | | 9/2017 | |
| WO | 2016121409 A1 | | 11/2017 | |

OTHER PUBLICATIONS

European Office Action from European Application No. 16795293.6, dated Nov. 11, 2020, 7 pages.

Samsung: "Discussion on enhanced Cat 2-based UL LBT"; 3GPP TSG RAN WG1 Meeting #84; R1-160570; dated Feb. 15-19, 2016, 5 pages.

* cited by examiner

LISTEN BEFORE TALK OPERATION WITH VARIABLE THRESHOLD

TECHNICAL FIELD

Various embodiments of the invention generally relate to selectively transmitting a signal on a spectrum depending on a threshold comparison between a sensed energy level and a threshold. Various embodiments of the invention specifically relate to determining the threshold depending on the signal type of the signal.

BACKGROUND

A spectrum can be accessed by multiple terminals for transmission of signals. In a scheduled system resources on the spectrum are pre-allocated to a certain terminal. Sometimes, however, resources on the spectrum are not pre-allocated to a certain terminal seeking to transmit the signal. Then, collision between multiple terminals attempting to transmit in the same resource can occur. An example is the unlicensed operation of wireless communication.

To mitigate interference, listen before talk operation can be employed. Here, a terminal that intends to transmit a signal on the spectrum first conducts a procedure of channel sensing to conclude whether the spectrum is already used by one or more other terminals. Channel sensing typically includes sensing an energy level of interference on the spectrum. Since a certain energy level will always be sensed, e.g., due to thermal noise, ambient noise, etc., typically, a threshold comparison is performed between the sensed energy level and a threshold. This enables to judge whether the sensed energy level should be considered as an interfering—i.e., currently transmitting—further terminal or not. Sometimes, this threshold is referred to as energy detection threshold.

If the sensed energy level exceeds the energy detection threshold, transmission of the signal can be postponed (back-off procedure). If the sensed energy level does not exceed the threshold, transmission of the signal can commence.

It has been observed that conventional techniques of listen before talk operation tend to suffer from increased latency and/or poor transmission reliability, in particular if the spectrum is accessed by many interfering terminals.

SUMMARY

Therefore, a need exists for advanced techniques of listen before talk operation. In particular, a need exists for techniques which overcome or mitigate at least some of the above identified restrictions on drawbacks.

This need is met by the features of the independent claims. The features of the dependent claims define embodiments.

A method comprises queuing a signal for transmission on the spectrum. The method further comprises sensing an energy level of interference on the spectrum. The method further comprises determining a threshold depending on a signal type of the signal. The method further comprises performing a threshold comparison between the sensed energy level and the determined threshold. The method further comprises selectively transmitting the signal on the spectrum depending on the threshold comparison.

A computer program product comprises program code that may be executed by at least one processor. Executing the program code causes the at least one processor to perform a method. The method comprises queuing a signal for transmission on the spectrum. The method further comprises sensing an energy level of interference on the spectrum. The method further comprises determining a threshold depending on a signal type of the signal. The method further comprises performing a threshold comparison between the sensed energy level and the determined threshold. The method further comprises selectively transmitting the signal on the spectrum depending on the threshold comparison.

A computer program comprises program code that may be executed by at least one processor. Executing the program code causes the at least one processor to perform a method. The method comprises queuing a signal for transmission on the spectrum. The method further comprises sensing an energy level of interference on the spectrum. The method further comprises determining a threshold depending on a signal type of the signal. The method further comprises performing a threshold comparison between the sensed energy level and the determined threshold. The method further comprises selectively transmitting the signal on the spectrum depending on the threshold comparison.

A terminal is configured to queue a signal for transmission on the spectrum; and to sense an energy level of interference on the spectrum; and to determine a threshold depending on the signal type of the signal; and to perform a threshold comparison between the sensed energy level and the determined threshold; and to selectively transmit the signal on the spectrum depending on the threshold comparison.

A method comprises transmitting a control message to a terminal. The control message is indicative of a plurality of thresholds. The control message prompts the terminal to select a threshold from the plurality of thresholds. The threshold is for a threshold comparison with a sensed energy level of interference on the spectrum. Said selecting depends on the signal type of a signal queued for transmission on the spectrum.

A computer program product comprises program code that may be executed by at least one processor. Executing the program code causes the at least one processor to perform a method. The method comprises transmitting a control message to a terminal. The control message is indicative of a plurality of thresholds. The control message prompts the terminal to select a threshold from the plurality of thresholds. The threshold is for a threshold comparison with a sensed energy level of interference on the spectrum. Said selecting depends on the signal type of a signal queued for transmission on the spectrum.

A computer program comprises program code that may be executed by at least one processor. Executing the program code causes the at least one processor to perform a method. The method comprises transmitting a control message to a terminal. The control message is indicative of a plurality of thresholds. The control message prompts the terminal to select a threshold from the plurality of thresholds. The threshold is for a threshold comparison with a sensed energy level of interference on the spectrum. Said selecting depends on the signal type of a signal queued for transmission on the spectrum.

A node is configured to transmit a control message to the terminal. The control message is indicative of a plurality of thresholds. The control message prompts the terminal to select, from the plurality of thresholds, a threshold of a threshold comparison with the sensed energy level of interference on the spectrum depending on the signal type of a signal queued for transmission on the spectrum.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, embodiments of the invention will be described in detail with reference to the accompanying drawings. The following description of embodiments is not to be taken in a limiting sense. The scope of the invention is not intended to be limited by the embodiments described hereinafter or by the drawings which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Hereinafter, techniques of listen before talk operation are described. Generally, listen before talk operation may relate to selectively transmitting a signal on a spectrum depending on a threshold comparison between a sensed energy level and an energy detection threshold. For example, if the sensed energy level exceeds the energy detection threshold, this may be indicative of increased interference on the spectrum. Then, to avoid a transmission failure, transmission of the signal may not be executed. A back-off may be implemented. After a while, the energy level on the spectrum may be sensed again; then, a new transmission attempt can be made. Listen before talk techniques are sometimes also referred to as Carrier Sense Multiple Access/Collision Avoidance (CSMA/CA).

According to various examples, the energy detection threshold is dynamically adjusted. For this, terminal-residing logic may be employed to some larger or smaller degree. In particular, it is possible that the energy detection threshold is determined based on a signal type of a signal queued for transmission on the spectrum. In other words, different types of signal can be associated with different energy detection thresholds, even if transmitted by the same terminal. In other words, multiple energy detection thresholds can be used where two or more energy detection thresholds can be used for the same terminal. Such a dynamic determination of the energy detection threshold can be implemented by logic residing in the terminal; in particular, it may not be required to involve the network every time a signal is queued for transmission.

If compared to reference implementations where the network can reconfigure the energy detection threshold in a semi-static manner, such determination of the energy detection threshold by the terminal and depending on the signal type of the signal queued for transmission can offer reduce latency and may enable to tailor the listen before talk operation to the needs of different signal types.

The techniques described herein may find particular application for implementation of cellular technologies on an unlicensed spectrum. However, the techniques are not restricted to such an application. For example, the techniques may be readily employed for non-cellular technologies, e.g., IEEE 802.11x Wi-Fi transmission or satellite transmission.

In some examples, the signal type is related to the channel implemented on the spectrum and used for transmission of the respective signal. The channel may be broadcasted, i.e., targeted for multiple receivers, or dedicated, i.e., targeted for a single receiver. A channel can be mapped to physical transmissions in different ways, e.g., transmitted at the same time, but with different codes, e.g., in a Code Division Multiple Access (CDMA) technology. Also, different frequencies/subcarriers can be employed, e.g., in Frequency Division Multiple Access (FDMA) and in particular in orthogonal FDMA technologies. Alternating timeslots can be used in Time Division Multiple Access (TDMA) technology. Also, a combination of such technologies is possible. The different channels may be designed for different purposes within the system, such as to accommodate control data or payload data. For example, the control data may include, but is not limited to: system information, resource/scheduling information, power control commands, Acknowledgment Repeat Request (ARQ) signaling, random access signaling, pilot signals, synchronization signals, etc. Channels may also be designed to carry payload data, e.g., specific channels for multimedia broadcast, side link data, etc. may exist. There may be dedicated channels for data or shared channels for data.

Various examples are based on the finding that different signal types can have different priorities in terms of the need for decoding the data correctly at the receiver. For example, it has been observed that a system can operate well within the relatively high probability of erroneously decoded signals if the signals encode payload data or power control commands. On the other hand, it has been observed that the system often cannot operate well with a relatively high probability of erroneously decoded signals if the signals encode acknowledgment messages of a ARQ signaling, system information or if the signals relate to pilots. By dynamically determining the energy detection threshold depending on the signal type, it is possible to tailor the energy detection threshold in view of the different demands of different signal types. Then, the overall system performance can benefit.

Various examples are based on the finding that determining the probability for successful decoding of a transmitted signal is an important aspect of system design. For example, according to reference implementations, different error correction schemes can be applied for different signal types. For a scheduled system operating in the licensed spectrum, such choice of different error correction schemes is conventionally often the only dimension for tailoring the decoding probability. However, it has been observed that for transmission in an unlicensed spectrum a further property can be of relevance: this is the transmission probability, i.e., the probability of a transmission to be conducted as a result of pass/fail of the listen before talk operation, i.e., the threshold comparison with the energy detection threshold. From a system perspective, this can imply a new design aspect: a trade-off situation between the decoding probability and the transmission probability.

In other examples, other signal types can be taken into account, alternatively or additionally, to the channel used for transmission of the signal. For example, it could be possible to consider the service of data encoded by the signal queued for transmission. For example, it could be possible to consider the quality of service (QoS) associated with data encoded by the signal. For example, a mission-critical service could be executed in parallel with a web browsing "best-effort" service. Here, different energy detection thresholds can be chosen in view of, e.g., the decoding probability in the transmission probability imposed by the QoS of the respective service. Then, a higher likelihood of successful transmission can be provided for the signal encoding data of the service related to mission-critical operation if compared to the signal encoding data of the service relating to web browsing.

Figure 1:
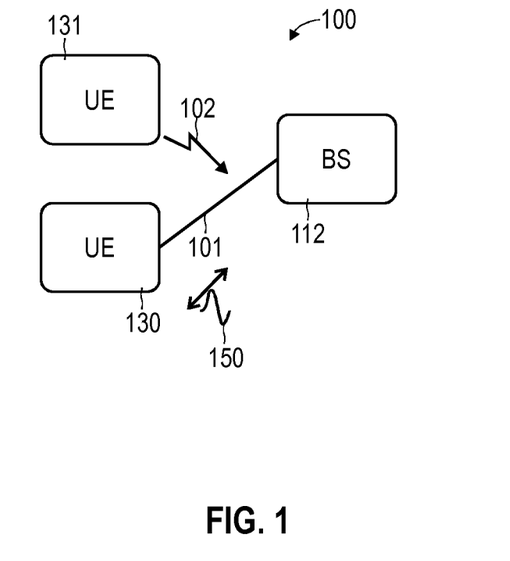
FIG. 1 schematically illustrates a network comprising a terminal and a base station implementing a radio link for transmission of signals on an unlicensed spectrum according to various examples.

FIG. 1 illustrates aspects with respect to a network 100. In the example of FIG. 1, a cellular network 100 comprising a terminal 130 and a base station (BS) 112—defining a cell—is illustrated. Generally, the various techniques described herein may be readily applied to other kinds and types of networks, e.g., peer-to-peer networks, ad-hoc networks, satellite networks, etc. The techniques may find particular application in 3GPP-specified cellular networks such as 4G and upcoming 5G.

A radio link 101 is implemented between the terminal 130 and the BS 112. It is possible to transmit signals 150 on the radio link 101. For example, downlink signals 150 may be transmitted from the BS 112 to the terminal 130; it is also possible to transmit uplink signals 150 from the terminal 130 to the BS 112.

In the example of FIG. 1, the radio link 101 is implemented on an unlicensed spectrum. Because of this, transmission of the signals 150 may suffer from interference 102 by a further terminal 131. The further terminal 131 may or may not be connected to the network 100. To mitigate the interference, a listen before talk operation is implemented. For example, if the terminal 130 has queued a signal 150 for transmission on the spectrum, it can sense an energy level of the interference 102 on the spectrum and perform a threshold comparison between the sensed energy level and the energy detection threshold. Then, depending on the threshold comparison, the terminal 130 may either transmit the signal 150 on the spectrum; or may back-off, i.e., wait for a certain period of time.

Generally, a lower energy detection threshold may reduce the risk of hidden node problems where the terminal 130 may not be aware of the presence of the further terminal 131 and may not succeed with transmission due to significant interference 102. On the other hand, a higher energy detection threshold reduces the transmission probability, in particular on a noisy spectrum. A trade-off situation results. Furthermore, often, the maximum energy detection threshold is limited by regulatory requirements in order to avoid excessive interference 102 caused by certain terminals.

For example, in reference implementations, the terminal 130 would be statically configured with a certain network-defined energy detection threshold. The energy detection threshold would be employed for any transmission of signals 150 originating from the terminal 130. In view of the above-identified trade-off situation between a high energy detection threshold and the low energy detection threshold, such a static configuration of the energy detection threshold can reduce the overall system performance.

Figure 2:
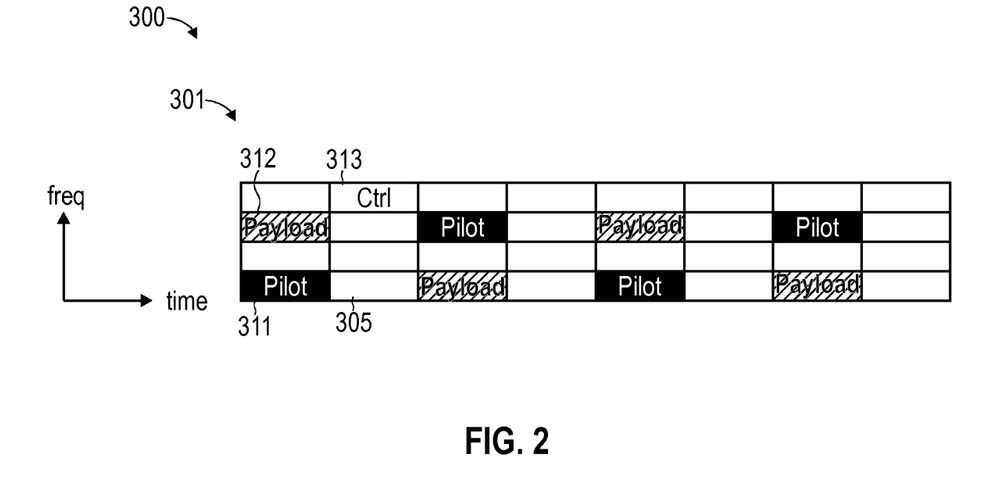
FIG. 2 schematically illustrates a resource mapping of resources associated with different channels of the radio link according to various examples.

FIG. 2 illustrates aspects with respect to channels 311-313 implemented on the spectrum 300 and associated with the radio link 101. Each channel 311-313 allocates certain resources 305 defined in time domain and frequency domain. The resources 305 are sometimes referred to as resource elements, subcarriers or resource blocks. The resources 305 are distributed between the channels 311-313 according to a resource mapping 301. The resources 305 define a time-frequency grid. Orthogonal frequency division multiplexing (OFDM) techniques can be employed to benefit from the FDMA techniques. Alternatively or additionally, a CDMA technology could be employed (not shown in FIG. 2).

For example, the channel 311 is reserved for transmission of pilot signals or pilots. The pilot signals help to implement channel sensing. The channel 312 is reserved for transmission of signals encoding payload data, i.e., higher-layer user data. For example, the payload data may be associated with one or more services implemented on an application layer of a transmission protocol stack. The channel 313 is reserved for transmission of signals encoding control data. E.g., the control data can relate to Layer 1, Layer 2 or Layer 3 control data—e.g., according to the Open Systems Interface (OSI) model. The control data can facilitate the implementation of the radio link 101.

From FIG. 2 it is apparent that different signals 150 transmitted on the radio link 101 can be characterized by a signal type which relates to the channel 311-313 implemented on the spectrum 300 and used for transmission of the respective signal 150. Here, the channel 311-313 may be one of the payload channel 312 and a control channel 313. In general, other types of channels are conceivable.

Figure 3:
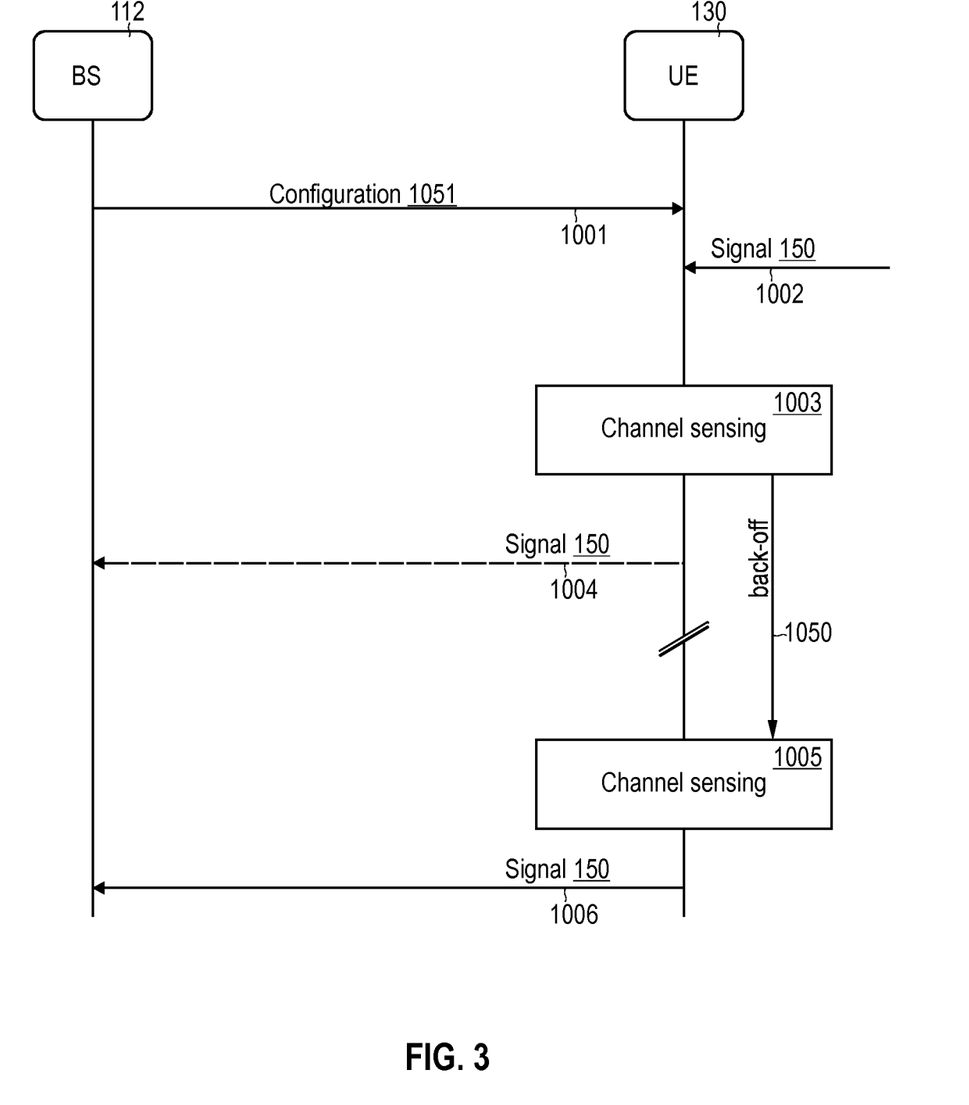
FIG. 3 schematically illustrates control signaling and a listen before talk operation configured by the control signaling according to various examples.

FIG. 3 is a signaling diagram of transmission on the radio link 101 between the BS 112 and the terminal 130. FIG. 3 illustrates aspects with respect to a listen before talk operation.

First, at 1001, the BS 112 transmits a control message 1051 to the terminal 130. The terminal 130 receives the control message 1051. The control message 1051 is indicative of a plurality of energy detection thresholds. This allows the terminal 132 select different thresholds for different signal types from the energy detection thresholds indicated by the control message 1051. As such, the plurality of energy detection thresholds indicated by the control message 1051 may be referred to as candidate energy detection thresholds. For example, it would be possible that the control message 1051 is also indicative of signal types associated with the various candidate energy detection thresholds. For example, the network 100 could determine the candidate energy detection thresholds based on regulatory requirements, etc.

For example, the control message 1051 could be indicative of the candidate energy detection thresholds explicitly or implicitly and/or in absolute values or relative values for certain channels with respect to a reference value. For example, the control message 1051 could be transmitted during an Attach procedure as part of which the terminal 130 establishes one or more of the channels 311-313 on the radio link 101 and/or establishes a data connection with the BS 112.

Then, after a while, a signal 150 arrives in a transmit buffer of the terminal 130, 1002. For example, the signal 150 may arrive in a Layer 1 transmit buffer from a higher layer of the transmission protocol stack. For example, the signal 150 may encode uplink payload data. The uplink payload data may originate from a service executed by an application layer of the transmission protocol stack of the terminal 130. In other examples, the signal 150 may, e.g., encode uplink control data, etc.

At block 1003, the terminal 130 performs channel sensing. This can include sensing an energy level of interference 102 on the spectrum 300. For this, it would be possible that an interface of the terminal 130 is configured to sense the spectral energy density.

In some examples, the energy level of interference 102 can be sensed in an integrated manner across the entire spectrum 300. In other words, it may be possible that the energy level of interference 102 is sensed across the entire system bandwidth (for example, in FIG. 2, the system bandwidth covers for resource elements 305 in frequency domain). Here, a frequency resolution is not provided or only provided to a limited degree. However, in other examples, the energy level of interference 102 can be sensed depending on the signal type of the signal 150. For example, the energy level could be sensed in a frequency-resolved manner in resources 305 of the channel 311-313 to which the signal type of the signal 150 queued for transmission relates to (for example, in FIG. 2, this could relate to sending the energy level of interference 102 only in the frequencies occupied by resource elements 305 allocated to the payload channel 312). Other resources 305 may be spared from said sensing.

Channel sensing at block 1003 can further include performing a threshold comparison between the sensed energy level and an energy detection threshold. In the example of FIG. 3, the sensed energy level exceeds the energy detection threshold. Because of this, a back-off is performed and the signal 150 is not transmitted at the occasion 1004 (indicated by the dashed line in FIG. 3). Instead, after a back-off duration 1050, channel sensing is executed anew, block 1005. This time, the sensed energy level remains below the energy detection threshold and the signal 150 is then transmitted at occasion 1006. This may be because the energy detection threshold has changed and/or because the sensed energy level has changed.

Figure 4:
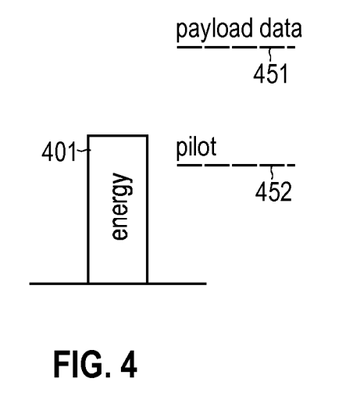
FIG. 4 schematically illustrates a signal type-dependent energy detection threshold according to various examples.

FIG. 4 illustrates aspects with respect to the energy detection threshold 451, 452. In FIG. 4, also the sensed energy level 401 is illustrated. In the various examples described herein, the energy detection threshold 451, 452 is determined depending on a signal type of the signal 150 queued for transmission on the spectrum 300. This is also illustrated in FIG. 4. In particular, in the example of FIG. 4, different energy detection thresholds 451, 452 are determined for the signal type relating to a pilot signal and for the signal type relating to payload data.

Generally, the signal type considered when determining the energy detection threshold 451, 452 may vary for different implementations. For example, the signal type may relate to the channel 311-313 implemented on the spectrum 300 and used for transmission of the respective signal 150. For example, the same energy detection threshold could be used for a set of channels. For example, the signal type may be selected from the group comprising: pilot signals; data encoded by the signal; best-effort data; guaranteed-delivery data; event-triggered data; control data; payload data; and a service of data encoded by the signal.

For example, best-effort data may have a limited lifetime and may be associated with the QoS not requiring 100% probability of successful and/or uncorrupted transmission within the limited lifetime. Thus, for best-effort data it can be acceptable if a certain fraction of the best-effort data is not successfully transmitted or transmitted corrupted. This can be different to guaranteed-delivery data. Event-triggered data can be data that is not occurring according to a repetitive timing; but rather at certain events. For example, in Internet of Things applications or Machine-type Communication applications, such event-triggered data can have mission-critical character. Then, timely delivery of uncorrupted event-triggered data can be mandatory.

In the example of FIG. 4, the terminal 130 uses two (or more) energy detection thresholds. In particular, the terminal 130 implements two energy detection thresholds 451, 452 simultaneously. This can be due to multiple signals—relating to the payload data and the further signal, i.e., the pilot signal—being queued for transmission simultaneously. In the example of FIG. 4, the same sensed energy level 401 is used for the threshold comparison with the different energy detection thresholds 451, 452. This results in transmission of the signal 150 encoding the payload data being allowed; while transmission of the pilot signal 150 is not allowed.

Figure 5:
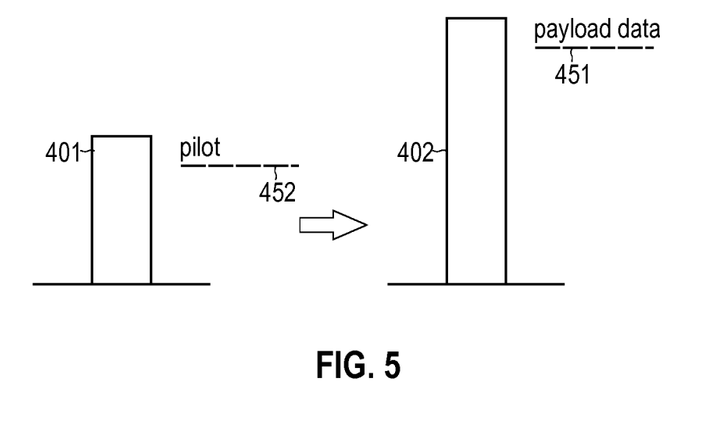
FIG. 5 schematically illustrates the signal type-dependent energy detection threshold according to various examples.

FIG. 5 illustrates aspects with respect to the energy detection thresholds 451, 452. In the example of FIG. 5, the different energy detection thresholds 451, 452 are used for different transmission attempts in time domain. E.g., different energy detection levels may be used based on the content of the transmission buffer. For example, more critical information residing in the transmission buffer can be associated with a higher energy detection threshold.

In the example of FIG. 5, different sensed energy levels 401, 402 are used for the threshold comparison with the different energy detection thresholds 451, 452. This can have different reasons. For example, it could be possible that the pilot signals 150 are associated with a different channel—having different resources 305 in the resource mapping 301—if compared to the channel associated with the signals encoding the payload data. Then, if a time-frequency resolved sensing of the energy level 401, 402 is implemented depending on the signal type, this may result in different energy levels 401, 402. A further reason could be that the signal encoding the payload data arrives in the transmit buffer only once the pilot signal 150 is already been transmitted (indicated by the horizontal arrow in FIG. 5). Then, a further energy level 402 can be sensed which—due to the time-dependency of the interference 102—differs from the energy level 401 and is up-to-date. A further threshold comparison can be performed between the sensed further energy level 402 and the energy detection threshold 451. Depending on the further threshold comparison, the signal encoding the payload data can be selectively transmitted on the spectrum 300.

Figure 6:
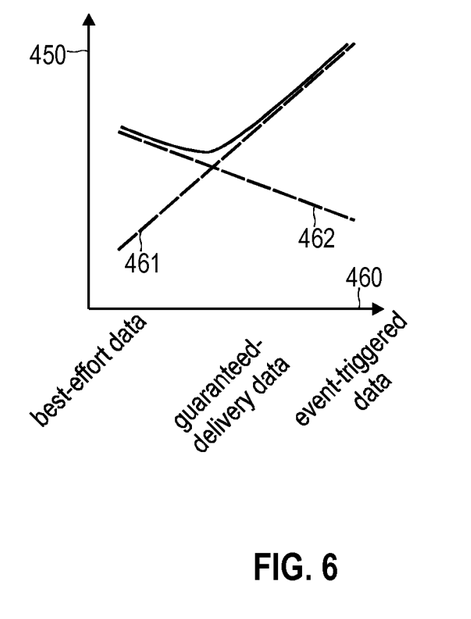
FIG. 6 schematically illustrates determining of the energy detection threshold depending on a decoding probability and a transmission probability associated with the quality of service of data encoded by a transmitted signal according to various examples.

FIG. 6 illustrates aspects with respect to determining the energy detection threshold 450 (full line in FIG. 6). In the example of FIG. 6, the energy detection threshold 450 is determined depending on the signal type of the signal 150 queued for transmission on the spectrum 300, wherein the signal type relates to a QoS 460 of data encoded by the signal 150. In the example of FIG. 6, the QoS of the data encoded by the signal 150 determines, first, a decoding probability 461 and, second, a transmission probability 462.

For example, best-effort data might be associated with a comparably large transmission probability in order to compensate for sporadic losses. However, best-effort data (left-hand side of FIG. 6) may have a QoS 460 associated with a comparably low decoding probability 461—accounting for the fact that sporadic losses are acceptable. These figures of merit may be inverted for event-triggered data (right hand side of FIG. 6). Here, a comparably low transmission probability may be acceptable, because events may be considered to be repetitive. On the other hand, it may be crucial that decoding errors do not occur to avoid misinterpretation of, e.g., sensor data; this implies that the decoding probability 460 is comparably high. Guaranteed-delivery data may mark an intermediate case between best-effort data and event-triggered data. Such dependencies are examples only and may differ from implementation to implementation.

In the example of FIG. 6, the energy detection threshold 450 is then determined based on, both, the decoding probability 461, as well as based on the transmission probability 462. This causes a nonlinear dependency of the threshold on the classification according to the QoS 460.

In other examples, it is also possible that the energy detection threshold is determined solely depending on the decoding probability 461 or solely depending on the transmission probability 462. In still other examples, it would also be possible to take into account other figures of merit defined by the QoS of the data encoded by the signal 150, e.g., a latency, etc.

Figure 7:
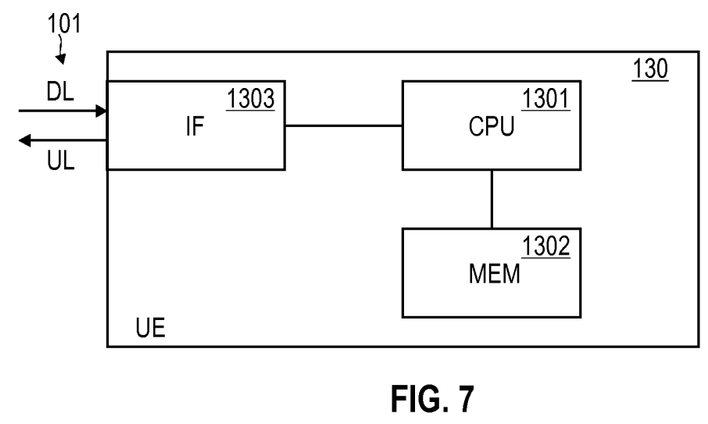
FIG. 7 schematically illustrates the terminal according to various examples.

FIG. 7 illustrates aspects with respect to the terminal (labeled user equipment, UE in the FIGs.). The terminal 130 includes a processor 1301 and a memory 1302. Furthermore, the terminal 130 includes an interface 1303, e.g., having an analog front end and a digital front end. Using the interface 1303, transmission of uplink signals 150 and/or downlink signals 150 on the radio link 101 is possible. The memory 1302 may store program code that may be executed by the processor 1301. Executing the program code can cause the processor 1301 to perform techniques of listen before talk operation according to the various examples described herein. For example, execution of the program code can cause the processor 1301 to analyze a signal queued for transmission to determine the signal type thereof. Then, the processor 1301 may determine an energy detection threshold depending on the signal type. This energy detection threshold can be used for listen before talk operation.

Figure 8:
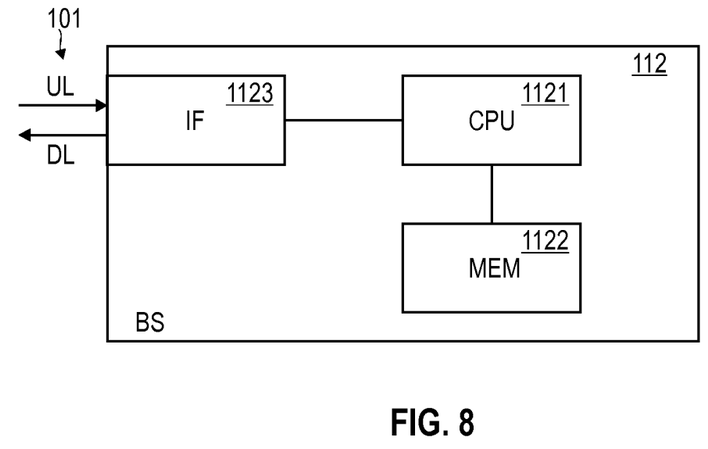
FIG. 8 schematically illustrates the base station according to various examples.

FIG. 8 illustrates aspects with respect to the BS 112. The BS 112 includes a processor 1121 and a memory 1122. Furthermore, the BS 112 includes an interface 1123, e.g., having an analog front end and a digital front end. Using the interface 1123, transmission of uplink signals 150 and/or downlink signals 150 on the radio link 101 is possible. The memory 1122 may store program code that may be executed by the processor 1121. Executing the program code can cause the processor 1121 to perform techniques of listen before talk operation according to various examples described herein. For example, execution of the program code can cause the processor 1121 to transmit, via the interface 1123, a control message indicative of a plurality of energy detection thresholds and optionally indicative of associated signal types. This may facilitate determining signal-specific energy detection thresholds at the terminal 130.

Figure 9:
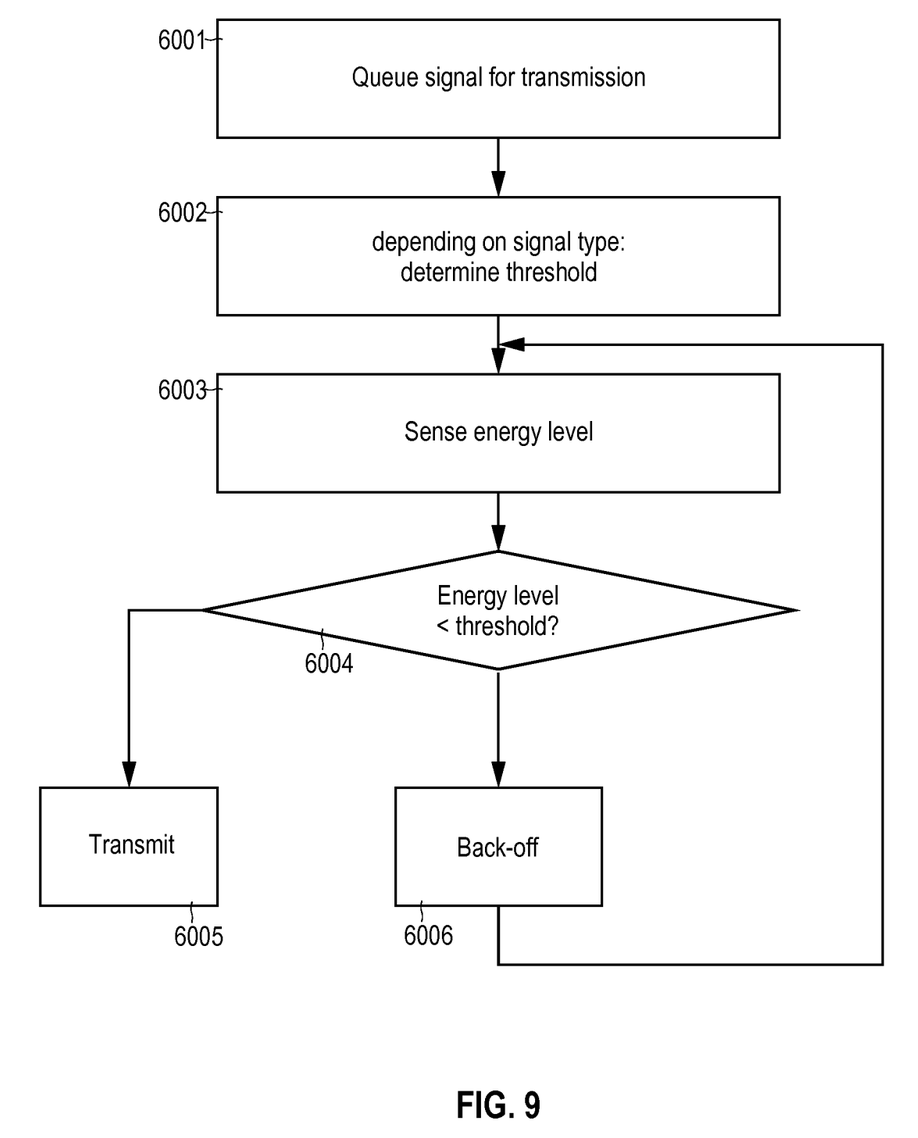
FIG. 9 is a flowchart of a method according to various examples.

FIG. 9 is a flowchart of a method according to various examples. At block 6001, a signal is queued for transmission. For example, a downlink signal or an uplink signal may be queued for transmission. The signal may be a pilot signal or another control signal such as a synchronization signal, etc. It would also be possible that the signal encodes data, e.g., control data or payload data. The signal may be associated with one of a plurality of channels implemented on a radio link. Examples of such channels include a control channel in the payload channel.

In block 6002, an energy detection threshold is determined depending on a signal type queued for transmission in block 6001. For example, the signal type may relate to the channel associated with the transmission of the signal. It would also be possible that the signal type relates to the type of the data encoded by the signal, e.g., whether the data relates to best-effort data, guaranteed-delivery data, event-triggered data, control data, payload data in general, etc. It would also be possible that the signal type is associated with the QoS of the data encoded by the signal. Here, different figures of merit of the QoS could be taken into account, including, but not limited to: decoding probability; transmission probability; and latency. In a further example, the signal type could relate to a service of payload data encoded by the signal.

Thus, in block 6002, different energy detection thresholds can be determined for different signal types. Hence, the energy detection threshold may be signal type-specific.

Next, in block 6003, an energy level is sensed on the spectrum. This corresponds to channel sensing.

In block 6004, a threshold comparison between the sensed energy level of block 6003 and the determined threshold of block 6002 is performed. If the sensed energy level is below the energy detection threshold, it can be judged that the interference on the spectrum is comparably low and that transmission of the signal is possible. Hence, at block 6005, the signal is transmitted. However, if the sensed energy level is above the energy detection threshold, it can be judged that the interference on the spectrum is significant and that transmission of the signal is not possible. Then, a back-off procedure is performed, block 6006. After a timeout period, the energy level is then sensed anew, i.e., blocks 6003, 6004 are executed anew.

Figure 10:
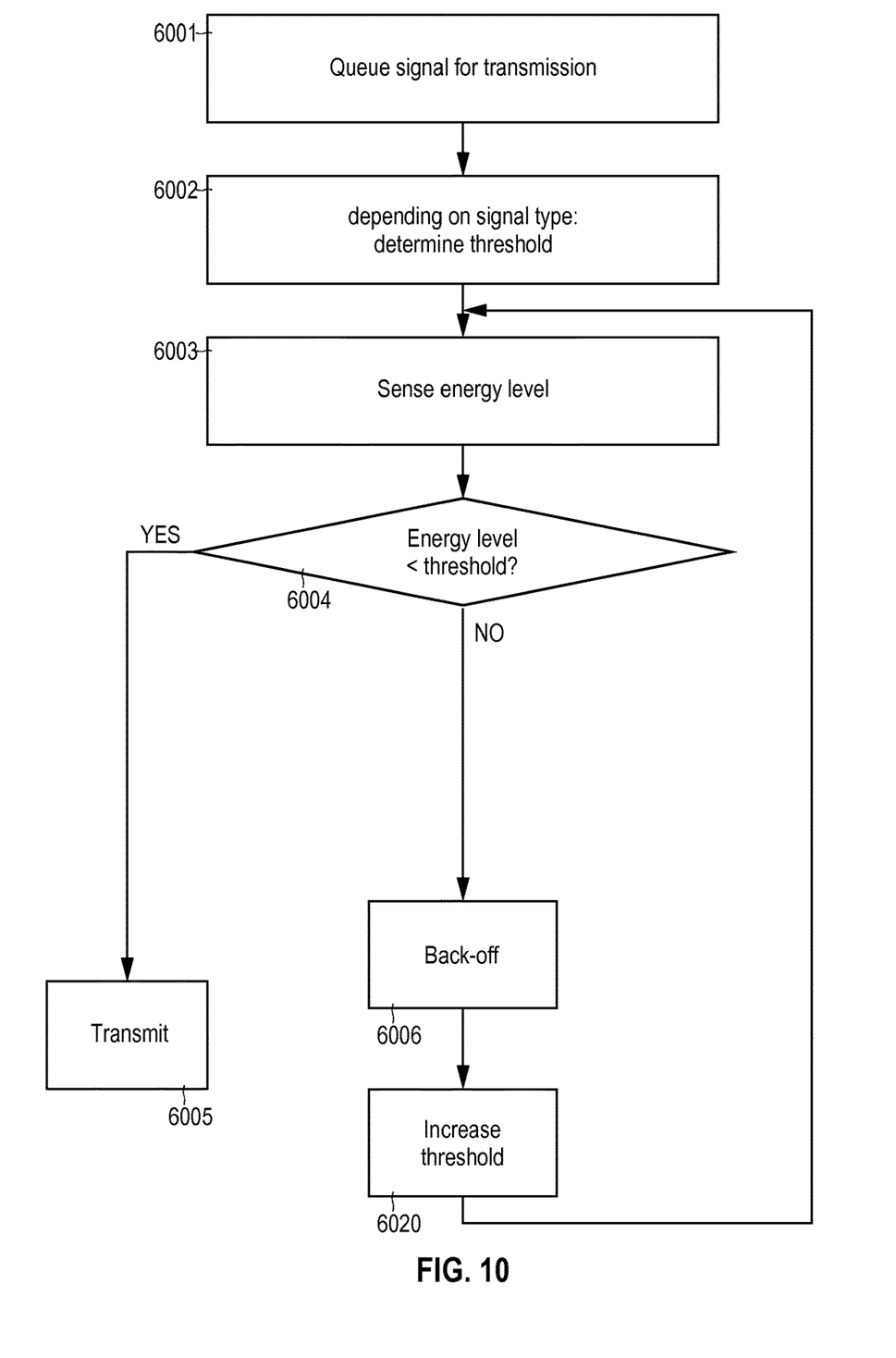
FIG. 10 is a flowchart of a method according to various examples.

FIG. 10 is a flowchart of a method according to various examples. The method according to the example of FIG. 10 generally corresponds to the method according to the example of FIG. 9. In the example of FIG. 10, if a back-off procedure is performed at block 6006, also the energy detection threshold is adjusted while the signal is still being queued for transmission. In particular, at block 6020, the energy detection threshold initially determined at block 6002 is increased. This increases the general likelihood that in the next iteration of block 6004 the sensed energy level is below the threshold. This increases the overall transmission probability of the signal in view of a potentially limited lifetime of the data encoded by the signal or the signal itself.

For example, the functionality of block 6020 may be selectively enabled depending on the signal type of the signal queued for transmission. For example, the increment of the adjustment of the energy detection threshold in block 6020 may depend on the signal type. Thereby, signals which are more sensitive to the transmission probability can be treated differently from signals that are more robust with respect to a reduced transmission probability. For example, it would be possible that the adjusting of the energy detection threshold is based on the transmission probability associated with the QoS of data encoded by the signal.

Summarizing, above techniques have been described enable to implement multiple energy detection thresholds in a single terminal. Different energy detection thresholds can be applied for different transmission channels.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims. For example, while various examples have been described with respect to energy detection thresholds being determined depending on a channel, similar techniques may be readily implemented for other signal types.

The invention claimed is:

1. A method, comprising:
readying a signal for transmission on a spectrum on which one or more channels are implemented;
determining a threshold based on a signal type of the signal, wherein the signal type indicates a type of the signal and a channel, of the one or more channels implemented on the spectrum, used for transmission of a respective signal having the signal type;
sensing an energy level of interference on the spectrum, wherein the energy level is sensed in a frequency-resolved manner in resources of the channel indicated by the signal type;
performing a threshold comparison between the sensed energy level and the determined threshold; and
depending on the threshold comparison, selectively transmitting the signal on the spectrum.

2. The method of claim 1, further comprising:
queueing a further signal for transmission on the spectrum,
depending on the signal type of the further signal, determining a further threshold different from the threshold,
performing a further threshold comparison between the sensed energy level and the determined further threshold, and
depending on the further threshold comparison, selectively transmitting the further signal on the spectrum.

3. The method of claim 1, further comprising:
queueing a further signal for transmission on the spectrum,
depending on the signal type of the further signal, determining a further threshold different from the threshold,
sensing a further energy level on the spectrum,
performing a further threshold comparison between the sensed further energy level and the further threshold, and
depending on the further threshold comparison, selectively transmitting the further signal on the spectrum.

4. The method of claim 1,
mwherein the channel is one of a payload channel and a control channel.

5. The method of claim 1,
wherein the signal type is selected from the group comprising: pilot signal; data encoded by the signal; best-effort data; guaranteed-delivery data; event-triggered data;
control data; payload data; and a service of data encoded by the signal.

6. The method of claim 1,
wherein the signal type relates to a quality of service of data encoded by the respective signal,
wherein the threshold is determined based on a decoding probability associated with the quality of service class.

7. The method of claim 1,
wherein the signal type relates to a quality of service of data encoded by the respective signal,
wherein the threshold is determined based on a transmission probability associated with the quality of service class.

8. The method of claim 1, further comprising:
receiving a control message indicative of a plurality of candidate thresholds and optionally of associated signal types,
wherein the threshold is selected from the plurality of candidate thresholds.

9. The method of claim 1,
wherein the spectrum is an unlicensed spectrum.

10. The method of claim 1, further comprising:
adjusting the determined threshold while the signal is being queued for transmission.

11. The method of claim 10,
wherein said adjusting of the determined threshold is based on a transmission probability associated with a quality of service of data encoded by the respective signal.

12. A terminal, comprising:
a wireless interface; and
a processor that executes computer-executable instructions and becomes configured to:
prepare a signal for transmission on a spectrum on which one or more channels are implemented;
determine a threshold based on a signal type of the signal, wherein the signal type indicates a type of the signal and a channel, of the one or more channels implemented on the spectrum, used for transmission of a respective signal havinq the signal type;
sense an energy level of interference on the spectrum, wherein the energy level is sensed in a frequency-resolved manner in resources of the channel indicative by the signal type;
perform a threshold comparison between the sensed energy level and the determined threshold; and
selectively transmit the signal on the spectrum depending on the threshold comparison.

13. A method for a node, comprising:
transmitting a control message to a terminal, the control message being indicative of a plurality of thresholds and prompting the terminal to select, from the plurality of thresholds, a threshold of a threshold comparison with a sensed energy level of interference on a spectrum on which one or more channels are implemented,
wherein the threshold is selected based on a signal type of a signal ready for transmission on the spectrum,
wherein the signal type indicates a type of the signal and a channel, of the one the more channels implemented on the spectrum, used for transmission of a respective signal havinq the signal type, and
wherein the energy level is sensed in a frequency-resolved manner in resources of the channel indicated by the signal type.

14. A node, comprising:
a wireless interface; and
a processor that executes computer-executable instructions and becomes configured to:
- transmit a control message to a terminal, the control message being indicative of a plurality of thresholds and prompting the terminal to select, from the plurality of thresholds, a threshold of a threshold comparison with a sensed energy level of interference on a spectrum on which one or more channels are implemented, wherein the threshold is selected based on the signal type of a signal ready for transmission on the spectrum,
- wherein the signal type indicates a type of the signal and a channel, of the one or more channels implemented on the spectrum, used for transmission of a respective signal having the signal type, and
- wherein the energy level is sensed in a frequency-resolved manner in resources of the channel indicated by the signal type.

* * * * *